United States Patent [19]

Elion

[11] Patent Number: 4,525,026
[45] Date of Patent: Jun. 25, 1985

[54] OPTICAL FIBER PROTECTION BY POWDER FILLED COATINGS

[75] Inventor: Glenn R. Elion, Northborough, Mass.

[73] Assignee: Aetna Telecommunications Laboratories, Westboro, Mass.

[21] Appl. No.: 442,919

[22] Filed: Nov. 19, 1982

[51] Int. Cl.³ .............................................. G02B 5/172
[52] U.S. Cl. ............................. 350/96.23; 350/96.30; 427/163
[58] Field of Search ............... 350/96.23, 96.30, 96.33; 427/162, 163

[56] References Cited

U.S. PATENT DOCUMENTS 4,176,910 12/1979 Nöethe ........................... 350/96.23
4,324,453 4/1982 Patel ............................... 350/96.23

FOREIGN PATENT DOCUMENTS 2012066 7/1979 United Kingdom ............ 350/96.23

*Primary Examiner*—John Lee
*Attorney, Agent, or Firm*—Weingarten, Schurgin, Gagnebin & Hayes

[57] ABSTRACT

The optically transmissive fiber of a fiber optic cable is protected from degradation by corrosion from environmental fluids in high pressure and/or temperature environments. The light transmitting fiber is surrounded with one or more protective layers which contain finely divided particles, typically of the same composition as the corrodible components of the fiber, with the particles functioning to absorb and neutralize the corrosivity of the environmental fluids. These fluids cannot be entirely prevented from slowly penetrating the protective layers or coatings over time, particularly under the influence of the elevated temperatures or pressures. The particles are typically of a metal or metal oxide matching the metal or metal oxide constituent of the outer portions of the optical fiber itself. These particles typically are suspended in the polymeric, buffering layer directly surrounding the optical fiber. The particles are in a powdered form of micron size or smaller. This small size avoids micro bending losses typically associated with the presence of inhomogeneous layers adjacent to the optically transmitting fiber. Preferably before being buffer coated, the optical fiber is given a protective metal or metal oxide surface layer and a coupling agent layer may also be added between the fiber and buffer layer. This coupling layer is also doped with powders of the corrosion protecting elements. Outer layers such as cable sheathing may also include doping compounds to absorb or neutralize the corrosive environmental fluids.

30 Claims, 3 Drawing Figures

OPTICAL FIBER PROTECTION BY POWDER FILLED COATINGS

FIELD AND BACKGROUND OF THE INVENTION

The present invention relates to protective layering for fiber optics. In particular the invention relates to protective layers which protect optically transmissive fibers from corrosion and the resulting degradation of optical properties and loss of tensile strength in environments where fluids under conditions of high pressure or temperature in geophysical or deep sea explorations create a corrosive effects.

Optical fibers for transmitting light information are typically formed in an optical fiber cable containing one or more light transmitting optical fibers comprised of a glass core and cladding with optional protective coatings of polymeric buffers, metals, metal oxides or nitrides and others. These protective coating materials are often carried in a thin outer covering layer over the cladding. Surrounding the fiber a polymeric buffer is usually provided and its adherence to the underlying fiber may be enhanced by the inclusion of a layer of coupling agents between the fiber and buffer. Surrounding the buffer may be one or more additional protective layers which may be polymerized, braided or woven about the fiber.

Even the best of coverings for an optical fiber will slowly absorb and transmit to the fiber environmental fluids such as water, hydrogen sulfide, acids or bases, particularly under high temperature and pressure. The slow but nevertheless persistent penetration of these environmental substances through the outer layers will, over time, result in the corrosion of the inner fiber destroying not only its tensile strength but its optical transmission properties.

Any attempt to provide protective layering for the optical fiber must avoid increasing the microbending loss of the fiber resulting from the location of inhomogeneous materials directly adjacent to the optically transmitting fiber. It is also important that the protecting layers avoid being structured so that they are, or under environmental influences become, highly porous and thereby more rapidly admit under certain circumstances the corrosive environmental materials.

BRIEF SUMMARY OF THE INVENTION

In accordance with the teaching of the present invention, a protective cable for an optical fiber comprises one or more layers surrounding the fiber which are doped with a compound, typically corresponding to compounds within the glass cladding or outer protective coating of the optical fiber. Preferably the dopants are provided as particulate or powdered compounds within the polymeric material of a buffer layer directly surrounding the optical fiber. The powder is provided in a micron or submicron grain size which is sufficiently small to avoid large increases in micro-bending losses resulting from the presence of a foreign particulate material adjacent to the optically transmitting fiber. The small grain size also prevents excessive porosity of the polymeric buffer layer resulting from dissolving of the particulate material and thereby avoids an increase in permeability of the buffering layer to surrounding environmental fluids, particularly where elevated temperatures and pressures are encountered.

The dopants in the buffering layer, or other protective fiber layers, act to absorb the corrosivity of the penetrating environmental fluids so that the corrosion reaction reaches saturation or is neutralized, thereby greatly reducing the tendency to corrode the inner fiber even after penetration of the environmental fluids.

Corrosion absorbing or neutralizing compounds can be added to other protective layers including a layer intermediate between the fiber and buffer and comprising coupling agents to augment the binding of the buffer to the fiber as well as in surrounding sheathing for the cable outside the buffer consisting of one or more additional layers of polymeric, woven or braided material, some of which may provide a conventional hermetic sealing capability.

The fiber cladding, in addition to having silicon compounds, will typically include oxides of boron, germanium, or phosphorus among other elements to enhance the optical qualities of the fiber. In such case the surrounding buffering layer will typically include oxides of silicon and titanium as micron or submicron size powders dispersed throughout the polymeric material of the buffer. In other instances the fiber cladding is coated with a layer of a protective material such as metallic aluminum, tin oxide, or tin oxide followed by titanium oxide or in combination with the tin oxide. In such case the buffering material, as well as other outer layers, are provided with particles of such compounds, or similarly reactive metal compounds, to saturate or neutralize the reactive fluids before they reach the fiber.

As illustrated above, several embodiments of the invention are possible all acting to neutralize the corrosivity of environmental fluids as they penetrate cable protective layers to reach the optical fiber. Cables thus treated exhibit substantially increased life time, preserving for greater periods their tensile strength and desired optical properties.

BRIEF DESCRIPTION OF THE DRAWING

These and other features of the present invention are more fully set forth below in the solely exemplary detailed description and accompanying drawing of which.

DETAILED DESCRIPTION

The present invention contemplates protecting the glass constituents of the light transmitting fiber of an optical fiber cable from deterioration due to the corrosive effect of environmental fluids particularly under high temperature and pressure, by surrounding the glass fiber with one or more layers containing substances which absorb or neutralize the corrosivity of the environmental fluids.

Figure 1:
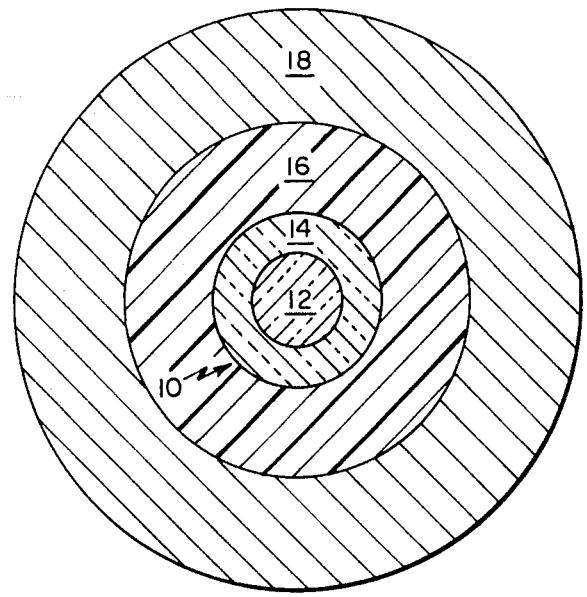
FIG. 1 illustrates a typical optical fiber cable in cross section showing protective layers surrounding an inner optically transmitting fiber.
Figure 2:
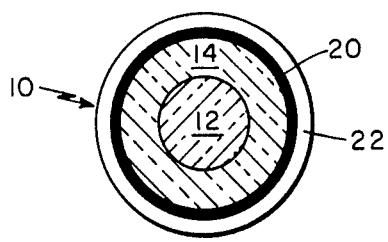
FIG. 2 is a cross sectional view of an optical fiber cable showing alternative layering schemes to FIG. 1.

With reference to FIG. 1 a typical optical fiber cable is illustrated in which a light transmitting fiber 10 includes an inner core 12 and an outer cladding 14. A polymeric buffer layer 16 surrounds the fiber 10 and is in turn encased in one or more layers 18 of sheathing which may be polymeric, polymerizable plastic, or braided or woven fabric of one or more types. Outer abrasion resisting layers and/or hermetic sealing layers may be included. Between the buffer 16 and fiber 10, and as illustrated in FIG. 2, one or more additional layers may be applied including a protective coating layer 20 consisdting of a metal or metal oxide along with a layer 22 adapted to enhance the coupling between the fiber 10 and the surrounding buffer layer 16.

In typical fiber construction, the inner core 12 may be of pure silica or silica with dopants. The cladding layer 14 will typically include dopants to enhance the optical properties of the fiber 10 as a whole. The cladding layer 14 will therefore typically include in addition to silicon dioxide, other compounds such as oxides of titanium, tin, boron, germanium, phosphorus and various oxides and nitrides as desired for the particular optical properties.

It is desired to provide protection of the fiber 10, and in particular the outer cladding layer 14, from the corrosive effects of environmental fluids. These fluids can include water or salt water resulting from exposure in deep sea applications to pressures substantially above 1000 psi, such as 10,000 psi, and temperatures well above 100° C., such as 200° C. One or more of the layers 16 and 18 is provided with protection by including particles of the corrodible constituents of the cladding layer 14 in those layers 16 and 18. In the particular case where the protection is provided in the buffer layers 16, finely divided powders in micron or submicron size grains are dispersed through the polymeric material of the buffer 16. Such powders can include any of the above mentioned components of the optical fibers or others. In particular, the particles can include such materials as tin oxides, titanium oxides, silicon oxides, aluminum oxides, silicon nitrides, silicon oxynitrides or combinations thereof. The purpose and effect of the powders is to saturate the reactivity of the fluids to neutralize the corrosive properties as they penetrate the buffer layer 16. Even in the most impermeable of polymeric materials, such fluids will reach the fiber 10 eventually and according to the present invention their corrosivity is effectively neutralized. Because the environmental fluids may be acid, basic or otherwise, the exact corrosive character of the invading fluid cannot always be predicted. For this reason there is advantage to formulating the powder dispersed throughout the buffer layer 16 of the same constituents as in the fiber 10 so that no matter which form of chemical reaction may take place, the reactivity of the fluid is exhausted by the powdered materials within the buffer layer 16 before exposure to the fiber 10.

The micron and submicron size for the particulate dispersed throughout the buffer 16 ensures that microbending losses resulting from the proximity of inhomogeneous buffering material in the layer 16 is minimized. In addition, the small particle size results in minimal increase in porosity to the buffer layer 16 once the environmental fluids have penetrated completely through it and substantially dissolved or bonded chemically to the powders dispersed within the layer 16. The layer 16 may be one or more coatings of such typical materials as ultraviolet or otherwise curable epoxies, silastics, nylons, silicones, or lacquers. The powdered additive is typically mixed in with the materials and applied to the fiber in conventional matter.

In the situation illustrated in FIG. 2 where the optical fiber 10 is coated with a protective layer 20 this layer may include metals or metal compounds where the metal is selected from the group of aluminum, silicon, tin, titanium, nickel and lead. For example, metallic aluminum, tin dioxide, titanium dioxide, or other compounds acting as an additional protective barrier may be used. The corrosion of this layer 20 is similarly inhibited by providing as the powder material dispersed throughout the surrounding buffer layer 16, micron or submicron size particles typically of the constituents of this layer 20. Where a coupling agent is applied in a coupling layer 22 as illustrated in FIG. 2, the coupling layer 22 is also provided with fine particulate or homogeneous material of the same compounds as found in the fiber 10, or where present, the outer protective fiber layer 20. Typical coupling agents include organic titanates and organic silanes and to these are optionally added the particulate material of the same constituency as protective layer 20 or cladding layer 14. The application and utilization of the coupling layer 22 in all other respects proceeds as is conventional in the art.

Figure 3:
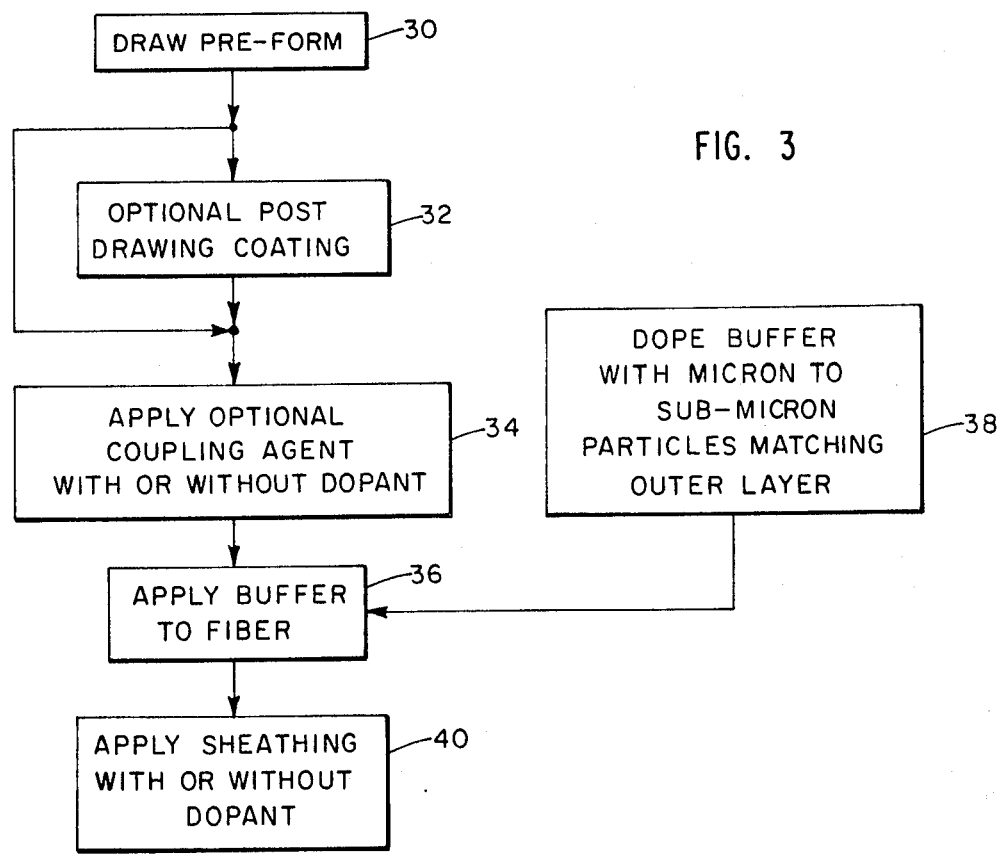
FIG. 3 is a flow chart illustrating the steps of fabricating an optical fiber protected by surrounding layers of material which absorb the corrosive action of environmental fluids, including several optional manufacturing steps.

FIG. 3 illustrates typical processing steps in the fabrication of an optical fiber cable in which the fiber is protected in accordance with the present invention. As is common in the fabrication of fibers, an initial step 30 involves drawing an optical fiber from a preform fabricated with the desired layering for core and cladding of the ultimately produced fiber. After the fiber is drawn in step 30, an optional coating step 32 is utilized to provide the additional protective layer such as layer 20 illustrated in FIG. 2 for the optical fiber. Subsequent, optional step 34 is utilized to provide the coupling layer 22 consisting of a coupling agent and this layer 22 may be provided as desired with powders of the finely divided particulate material identified for fiber protection. Subsequent to the step 34, the buffer, such as layer 16, is applied in a step 36 after the polymeric material forming the buffer layer is doped in step 38 with micron to submicron size particles forming the protective element of the buffer. After the application of the buffer 36, a subsequent step 40 finishes the cable formation with the application of one or more layers including polymerized, braided or woven sheathing layers and as desired outer abrasion resistance and/or hermetic sealing layers.

Typical dimensions include a 125 micron outside diameter optical fiber 10 with a buffer layer 16 resulting in a total outside diameter of 250 to 500 microns. The additional protecting or binder layers 20 and 22 are typically substantially smaller while the final set of layers 18 are of whatever dimensions the cable application requires.

Several examples below illustrate the application of the invention in specific embodiments.

EXAMPLE 1

An optical fiber such as the fiber 10 is coated with a protecting layer, such as the layer 20, of metallic aluminum. Micron sized particles are then added into a silicon mixture which is utilized to buffer the aluminum coated fiber. The particles are applied to the silicone mixture to produce a one percent by weight addition to the silicone polymer. After coating the fiber with the silicone and allowing it to cure the actual percent by weight of the powdered additive will exceed one percent.

EXAMPLE 2

An optical fiber is coated with a tin dioxide layer forming the final protective layer 20. Submicron sized particles of tin dioxide are added into an ultraviolet curable epoxy at the ratio of four percent by weight of tin dioxide. The fiber is coated with this mixture and the epoxy cured by ultraviolet light and aged for several weeks. After aging the weight percent tin dioxide has risen to six percent. The buffered cable was exposed to pH buffers of pH 3, 5, 7, and 9 at 80° C. for one week along with untreated, buffered cables. After one week exposure the tensile strength and remaining fiber weight was substantially higher for the fibers in which the buffer was treated with the powdered tin dioxide additive compared to the conventional control fibers.

EXAMPLE 3

An optical fiber was first coated with tin dioxide and then titanium dioxide to form together the protective layer 20. The thus coated fiber was sprayed with a layer of tyzor, a compound containing titanium dioxide and isopropyl alcohol, to act as a binding layer to improve coupling to a subsequently applied buffer. Submicron powders of tin dioxide and titanium dioxide were added to an ultraviolet curable epoxy in the proportions of 0.5 weight percent tin dioxide and 1.1 weight percent titanium dioxide. A high speed blender was utilized to provide a uniform mixture. The mixed material was applied and cured on the optical fiber as a buffer layer.

The resulting buffered fiber was exposed to aqueous solutions with pH values ranging from 3 to 10 at 80° C. for seven days with no noticeable change in fiber tensile strength. Autoclaving and temperature and pressure cycling caused precipitation of excess tin and titanium dioxide on the fiber buffer interface with no measureable change in the integrity of the oxide coating on the fiber.

EXAMPLE 4

In the fabrication of a composite cable containing metal wires for electrical power and strength along with optical fiber cables, an optical fiber was provided with an outer layer of titanium dioxide. The titanium dioxide layer was sprayed with a mixture of tyzor and fumed silica submicron size particles comprising three percent by weight of silica in the mixture. The tyzor and silica mixture was sprayed onto the outer cable coating and this layer subsequently coated with teflon.

The above description is illustrative of a range of embodiments for practicing the present invention, the specific disclosure being solely exemplary of the scope of the invention as defined in the following claims.

What is claimed is:

1. A process for protecting a fiber optic fiber against degradation from environmental substances comprising the steps of:
    applying a coating to an optical fiber;
    including in said coating particles of micron size or smaller of a material at least as chemically reactive with said environmental substances as components of said fiber.

2. The process of claim 1 wherein said applying step includes the step of applying a coupling agent to said fiber, said coupling agent including said particles of micron size or smaller.

3. The process of claim 1 wherein said applying step includes applying an outer sheathing for said optical fiber to form a fiber optic cable.

4. A process for protecting a fiber optic fiber against degradation from environmental substances, comprising the steps of:
    applying a coating to an optical fiber, said applying step including the step of applying a buffer to said fiber;
    including in said coating particles of micron size or smaller of a material at least as chemically reactive with said environmental substances as components of said fiber;
    said fiber components including one or more metals or metal compounds, and;
    said including step comprising including particles of metal or metal compounds substantially identical to metal or metal compounds comprising the components of said fiber.

5. A process for protecting a fiber optic fiber against degradation from environmental substances, comprising the steps of:
    applying an outer layer to said fiber, said layer being of a metal or metal compound material reactive with said environmental substances, the fiber components thus including one or more metals or metal compounds;
    applying a coating to said optical fiber, said applying step including the step of applying a buffer to said fiber;
    including in said coating particles of micron size or smaller of a material at least as chemically reactive with said environmental substances as components of said fiber;
    said including step comprising including particles of metal or metal compounds substantially identical to metal or metal compounds comprising the components of said fiber.

6. A process for protecting a fiber optic fiber against degradation from environmental substances, comprising the steps of:
    applying an outer layer to said fiber, said layer being of a metal or metal compound material reactive with said environmental substances, the fiber components thus including one or more metals or metal compounds;
    applying a coating to said optical fiber, said applying step including the step of applying a buffer to said fiber;
    including in said coating particles of micron size or smaller of a material at least as chemically reactive with said environmental substances as components of said fiber,
    said including step comprising including particles of metal or metal compounds substantially identical to metal or metal compounds comprising the components of said fiber;
    said particles of micron size or smaller being substantially the same material as comprises said fiber outer layer.

7. A process for protecting a fiber optic fiber against degradation from environmental substances, comprising the steps of:
    applying an outer layer to said fiber, said layer being of a metal or metal compound material reactive with said environmental substances, the fiber components thus including one or more metals or metal compounds;
    applying a coating to said optical fiber, said coating step comprising applying a buffer for said fiber over said fiber outer layer;
    including in said coating particles of micron size or smaller of a material at least as chemically reactive with said environmental substances as components of said fiber;

said including step comprising including particles of metal or metal compounds substantially identical to metal or metal compounds comprising the components of said fiber;

said particles of micron size or smaller being materials substantially matching the composition of said fiber outer layer.

8. A process for protecting a fiber optic fiber against degradation from environmental substances, comprising the steps of:

applying a coating to an optical fiber, said applying step including applying an outer sheathing for said optical fiber to form an optic cable, and further applying one or more intermediate layers between said fiber and said sheathing; and including in said coating particles of micron size or smaller of a material at least as chemically reactive with said environmental substances as components of said fiber;

including in said one or more layers protective powders comprising particles of micron size or smaller at least as reactive with said environmental substances as components of said optical fiber.

9. A coating for a composite containing an optical fiber and at least one metal or metal compound, to provide protection for said composite against corrosion by environmental substances under elevated temperatures or pressures or both, comprising:

a polymeric material capable of coating said composite and providing a penetration barrier between said environmental substances and said composite;

said polymeric material having dispersed in its particles of micron-to-submicron size of a material reactive with said environmental substances so that during penetration through said coating said environmental substances react with said reactive particles before reaching said composite.

10. The coating of claim 9 wherein said coating material includes a material providing an optical fiber buffer.

11. The coating of claim 10 wherein said coating material is selected from the group consisting of curable polymeric compounds.

12. The coating of claim 11 wherein said reactive particles comprise metals and metal compounds matching the components of said composite.

13. The coating of claim 9 further including a coupling agent between said composite and said polymeric coating and having therein a dopant material substantially the same as said particles of micron to sub-micron size of said coating material.

14. A protectively coated optical waveguide resistant to attack by environmental substances, comprising:

an inner composite including an optically transmissive fiber coated with a layer of cladding material which enhances the optical performance of said fiber;

a layer of polymeric material surrounding said inner composite and bonded to it; and powdered micron-to-submicron size material reactive with said environmental substances, said powdered material including particles of at least one of the constituents of said inner composite, and being dispersed in said layer of polymeric material, forming therewith a buffer layer to protect said inner composite from attack by environmental substances.

15. A protectively coated optical waveguide of claim 14, wherein said cladding material comprises:

at least one material selected from the group consisting of oxides and nitrides of silicon, titanium, tin, boron, germanium, and phosphorous.

16. A protectively coated optical waveguide of claim 14, wherein said inner composite further comprises:

a protective layer surrounding said cladding material and bonded to it.

17. A protectively coated optical waveguide of claim 16 wherein said protective layer further comprises:

at least one material selected from the group consisting of aluminum, silicon, tin, titanium, nickel, lead, and oxides of these metals.

18. A protectively coated optical waveguide of claim 14, further comprising:

a coupling layer between said inner composite and said layer of polymeric material.

19. A protectively coated optical waveguide of claim 18 wherein said coupling layer further comprises:

said powdered material, dispersed in said coupling layer.

20. A protectively coated optical waveguide of claim 14, further comprising:

at least one sheathing layer surrounding said layer of polymeric material and bonded to it.

21. A protectively coated optical waveguide of claim 20 wherein said sheathing layer further comprises:

said powdered material, dispersed in said sheathing layer.

22. A protectively coated optical waveguide resistant to attack by environmental substances, comprising:

an inner composite including an optically transmissive fiber coated with a layer of cladding material which enhances the optical performance of said fiber, and a protective layer surrounding said cladding material and bonded to it;

a layer of polymeric material surrounding said inner composite and bonded to it; and powdered micron-to-submicron size material reactive with said environmental substances, said powdered material including particles of at least one of the constituents of said inner composite;

said cladding material comprising at least one material selected from the group consisting of oxides and nitrides of silicon, titanium, tin, boron, germanium, and phosphorous;

said protective layer comprising at least one material selected from the group consisting of aluminum, silicon, tin, titanium, nickel, lead, and oxides of these metals; and said powdered material being dispersed in said layer of polymeric material, forming therewith a buffer layer to protect said inner composite from attack by environmental substances.

23. A protectively coated optical waveguide of claim 22, further comprising:

a coupling layer comprising an organic titanate or organic silane between said inner composite and said layer of polymeric material.

24. A protectively coated optical waveguide of claim 23 wherein said coupling layer further comprises:

said powdered material, dispersed in said coupling layer.

25. A protectively coated optical waveguide of claim 22, further comprising:

at least one sheating layer surrounding said layer of polymeric material and bonded to it.

26. A protectively coated optical waveguide of claim 25 wherein said sheathing layer further comprises:
said powdered material, dispersed in said sheathing layer.

27. A process for protecting a composite of an optically transmissive fiber and at least one layer of at least one metal or metal compound from attack by environmental substances, comprising the step of:
coating said composite with at least one layer of polymeric material containing a dispersion of powdered micron-to-submicron size particles which are reactive with environmental substances and which comprise at least one of the constituents of said composite, to form a buffer layer to protect said composite from attack by environmental substances.

28. The process of claim 27 wherein the constituents of said composite are selected from the group consisting of oxides of aluminum, silicon, tin, titanium, nickel, lead, boron, germanium and phosphorous; the metal forms of aluminum, silicon, tin, titanium, nickel, and lead; and nitrides of silicon, titanium, tin, boron, germanium, and phosphorous.

29. The process of claim 27 comprising the further step of:
forming a coupling layer between said composite and said layer of polymeric material,
said coupling layer comprising an organic titanate or organic silane and containing a dispersion of said powdered particles.

30. The process of claim 27 comprising the further step of:
forming at least one sheathing layer over said layer of polymeric material, said sheathing layer containing a dispersion of said powdered particles.

* * * * *